March 1, 1932.   A. BOLINAS, JR   1,847,209
FOLDING STEERING WHEEL AND LOCK
Filed Jan. 11, 1930   2 Sheets-Sheet 1
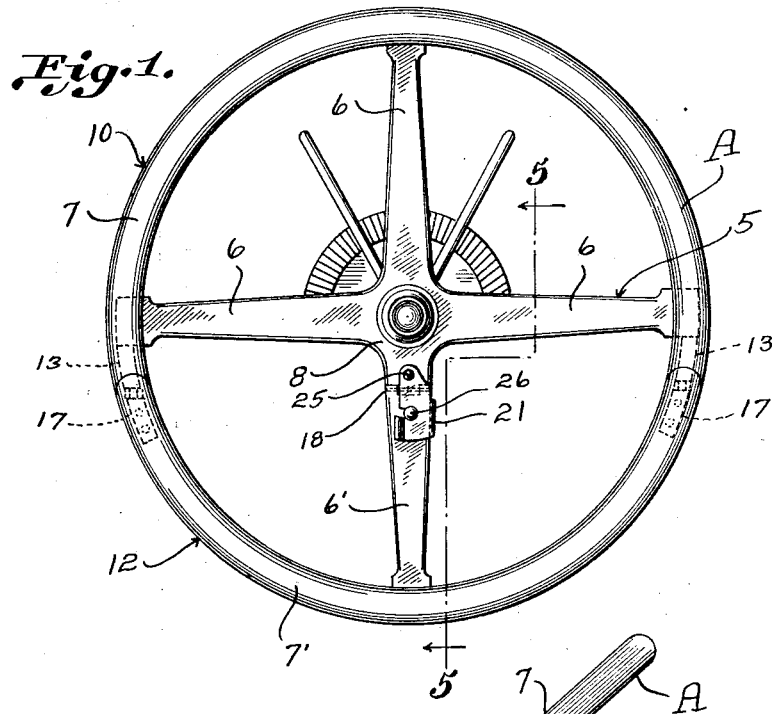
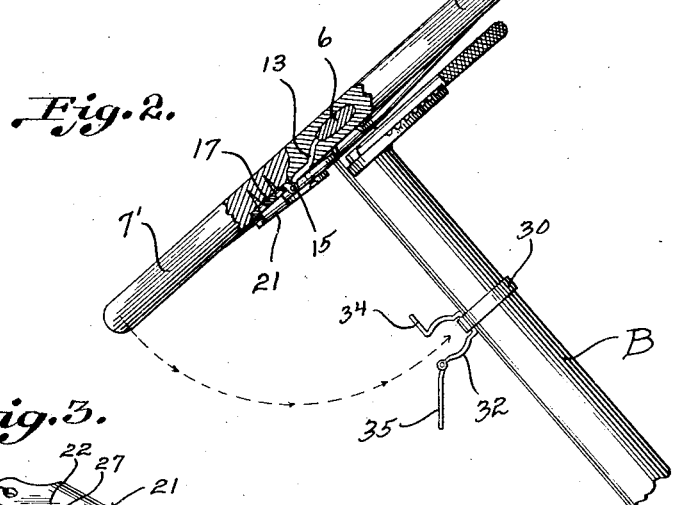
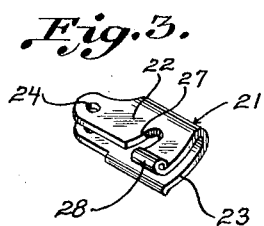
INVENTOR.
André Bolinas Jr.
BY
ATTORNEYS.

March 1, 1932. A. BOLINAS, JR 1,847,209
FOLDING STEERING WHEEL AND LOCK
Filed Jan. 11, 1930 2 Sheets-Sheet 2
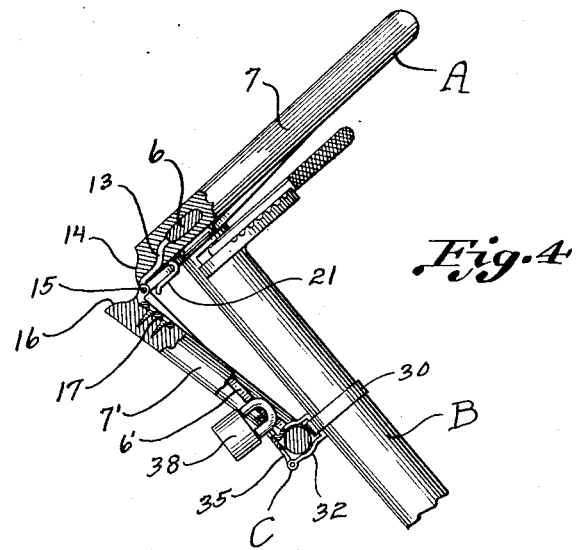
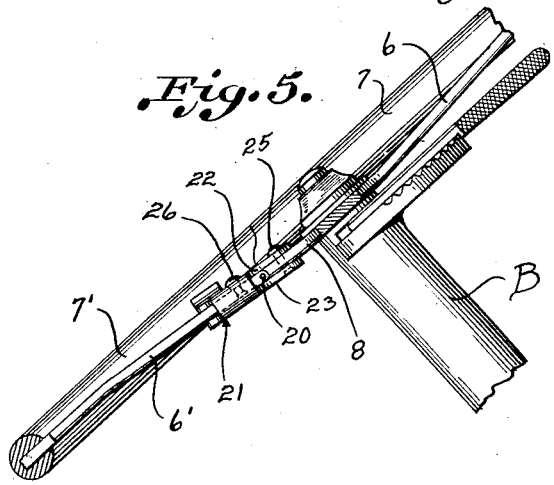
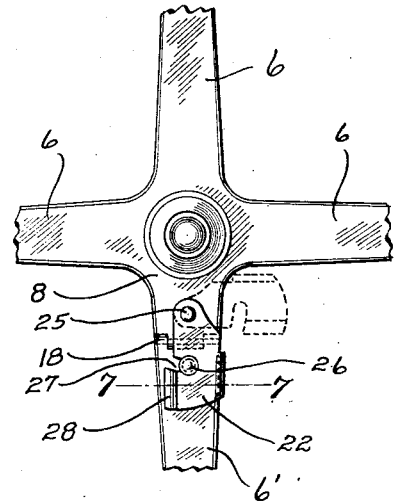
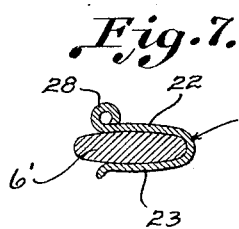
INVENTOR.
André Bolinas Jr
BY
ATTORNEYS.

Patented Mar. 1, 1932

1,847,209

UNITED STATES PATENT OFFICE

ANDRÉ BOLINAS, JR., OF LEGAZPI, ALBAY, PHILIPPINE ISLANDS

FOLDING STEERING WHEEL AND LOCK

Application filed January 11, 1930. Serial No. 420,214.

The present invention relates to improvements in steering apparatus for motor vehicles and the like and the primary object of the invention is to provide a steering wheel which may be collapsed for enabling ready entrance and exit of the driver from behind the wheel.

A further object of the invention is to provide a folding steering wheel embodying a drop section which may be folded against the steering column and which drop section when in an operative position with respect to the normally fixed section of the steering wheel is locked in a firm and rigid position against accidental dropping.

A further object of the invention is to provide a folding steering wheel of extremely simple and rigid construction and one which does not alter the general construction of conventional types of steering wheels to an extent requiring alteration of parts such as control devices closely associated with the steering wheel.

A still further object of the invention is to provide a steering wheel having a hinged drop section, and means for locking the drop section against the steering column for the wheel in a manner to prevent operation of the steering mechanism.

Other objects and advantages of the invention will be apparent during the course of the following detailed description, taken in connection with the accompanying drawings forming a part of this specification and in which drawings:

Figure 1 is a top plan view of the improved steering wheel.

Figure 2 is an edge view of the steering wheel shown mounted upon the steering column and with a portion of the wheel rim broken away for illustrating a hinge connection between the sections of the rim.

Figure 3 is a perspective view of the spring clasp for retaining the drop section of the wheel in aligning operative relation to the normally fixed section of the wheel.

Figure 4 is a view part in side elevation and part in section showing the drop section in a locked position against the steering column.

Figure 5 is an enlarged fragmentary section substantially on the line 5—5 of Figure 1.

Figure 6 is an enlarged fragmentary top plan view at the hub portion of the spider for the wheel and showing the manner in which the clasp may be swung to a released position for allowing downward swinging of the movable section of the steering wheel.

Figure 7 is an enlarged section on line 7—7 of Figure 6 showing the manner in which the spring clasp grips the arm of the drop section.

Referring to the drawings in detail, and wherein similar reference characters designate corresponding parts thruout the several views, the letter A may designate the improved folding steering wheel shown mounted upon a steering column B of conventional construction, and C locking means for securing a hinged segment of the wheel B in a lowered position against the steering column B.

The steering wheel A is formed with the spider 5 preferably formed with four right angularly arranged spokes or arms 6, 6, 6 and 6' on the outer end of which is mounted the rim 7. The hub portion 8 of the spider may be mounted in any usual manner upon the upper end of the steering post extended thru the hollow steering column B whereby upon rotation of the steering wheel, rotation will be imparted to the steering post.

The wheel A is divided at one side of its diametrical center into unequal segments providing a major or fixed section 10 and a minor or drop section 12. The outer ends of the three spokes 6 are connected with the rim portion of the major section 10, while the outer end of the spoke 6' is connected with the minor section 12 preferably midway between the point of connection of the rim sections. In the example shown the rim 7 has been shown formed of wood with the ends of the spokes 6 and 6' embedded in the rim between its upper and lower edges.

Preferably formed integral with the outer ends of each spoke or arm 6 extended at a right angle to the arm 6', is a hinge extension 13 offset downwardly to extend along the lower edge of the rim and terminating at the lower edge of the reversely curved end 14 of the rim portion of the major section 10. The end of each hinge or extension 13 is formed with an eye for receiving a hinge pin 15, the hinge pins 15 being in axial alignment at a right angle to the spoke 6'. The rim portion 7' of the minor section 12 has its ends reversly curved as at 16 to conform with the end formations 14 of the major rim section 7. Secured to the under side and at each end of the minor rim section 7' as by screws or any other suitable means are hinged leaves 17 having their outer ends interfitting with the hinge leaves 13 and adapted to receive the hinge pins 15 whereby the ends of the rim portion 7 are hingedly connected to the ends of the major rim portion 7. By observing Figures 2 and 4 it will be seen that by so hingedly connecting the rim portions of the wheel sections 10 and 12 at their lower sides and reversely curving the ends of the rim sections that a lap joint is formed between the rim sections limiting upward swinging movement of the minor section 12 beyond the plane of the major section 10.

The spoke or arm 6' closely adjacent the hub portion 8 of the spider 5 is formed with a hinged joint 18 having a hinge or pivot pin 20 which aligns axially with the hinge pins 15. As will be observed the hinge joint 18 is formed relatively close to the axis of the steering wheel and thus permits of a substantial portion of the wheel being dropped against the steering column and out of the way of a person moving past the rear of the wheel.

A keeper 21 is provided for releasably retaining the drop section 12 in the plane of the fixed section 10, and this keeper is in the form of a spring clasp formed with upper and lower plates 22 and 23 respectively being connected along their side edges adjacent the outer end of the clasp and forming a substantially U-shaped body for embracing the upper and lower sides of the spokes 6' outwardly of the hinge joint 18. The inner ends of the plates 22 and 23 are apertured as at 24 for receiving a pivot pin 25 extended thru the normally fixed portion of the spoke 6' inwardly of the hinge joint 18. The clasp has swinging movement laterally of the spoke 6' upon the pivot pin 25 into a released position as shown by dotted lines in Figure 6. Secured to and projecting upwardly from the movable portion of the arm 6' is a keeper pin 26, and the upper plate 22 of the keeper or clasp is provided with an arcuate slot 27 opening to the open edge of the clasp. The arc of the opening 27 is on the axis of the pivot pin 25. As in ordinary practice the steering wheel spokes are of substantially oval shape in cross section as clearly shown in Figure 7 and for insuring proper gripping of the clasp, the upper and lower plates 22 and 23 are outwardly bulged transversely of the clasp and so grip the oval-shaped spoke 6' as to prevent accidental swinging of the clasp out of holding engagement with the spoke. The clasp or keeper 21 as will be observed, bridges the portions of the spoke 6' to opposite sides of the hinge joint 18 and thus effectively retains the spoke sections in alignment and the minor or drop section 12 in the plane of the major or normally fixed section 10. The pin 26 projecting from the upper side of the spoke 6' thru its engagement in the arcuate slot 27 prevents downward swinging of the minor wheel section. The side edge of the upper clasp plate 22 is preferably rolled as at 28 beyond the slot 27 to provide a thumb grip to permit ready and easy swinging of the clasp into and out of holding engagement with the spoke 6'.

The means C for retaining the drop section 12 against the steering column B preferably embodies a collar 30 affixed in any preferred manner to the steering column, and preferably loosely mounted in the collar 30 is a clamp 32 formed with yieldable and arcuated arms forming a spring clip for receiving the rim portion 7' when swung between the yieldable arms. These spring arms will normally hold the drop wheel section in position against the steering column. A means is provided for permitting locking of the drop section in its lowered position in the clamp 32 and this means preferably consists in providing one of the clamp arms with an apertured extension 34 and hingedly connecting to the lower clamp arm a suitable hasp 35 which when swung upwardly against the extension 34 receives a suitable padlock 38 for locking the drop section in the clamp. This locked position of the drop section will prevent theft in that by so locking the drop section, rotation of the steering wheel is prevented.

By so having the keeper or clasp 21 formed as shown, the hinge joint 18 may be disposed relatively close to the axis of the steering wheel and yet allow for the clasp to be swung out of holding engagement with the spoke 6' and permit the drop section to swing thru an arc greater than 90° without being limited in its movement by the clasp. The formation of the clasp also permits hinging of the drop section on a line relatively near the diametrical center of the steering wheel so that the drop section may be formed as large as possible for providing a large clearance behind the wheel when the drop section is lowered.

The steering wheel is preferably mounted upon the steering post in a position so that when the steering wheels of the vehicle are in a straight forward position the spoke 6' will align longitudinally of the vehicle.

When desiring to fold the steering wheel for enabling a person to readily enter or leave the driver's seat, it is merely necessary to release the keeper 21 by pressing the thumb against the rolled edge 28 of the keeper and this releasing allows the section 12 to automatically drop to a vertical position. The wheel may then be slightly rotated in either direction for swinging the arm 6' to one side of the clamp 32 so that the rim portion 7' may be pressed between the yieldable arms of the clamp and held in position against the steering column. The clamp 32 is loosely mounted in the collar 30 to permit this slight rotation of the steering wheel. With the clamp 32 loosely mounted in the collar 30 the clamp may be slightly turned to one side or the other for properly receiving the rim 7'. If it is desired to lock the drop section in its lowered position the hasp 35 may be swung upwardly over the rim and the lock 38 passed thru the hasp and arm 34.

While the major section 10 of the steering wheel has been referred to as the normally fixed section it will of course be understood that the section 10 is revoluble.

From the foregoing description it will be apparent that a novel and improved construction for folding steering wheels has been provided wherein substantially one-half of the steering wheel may be swung downwardly against the steering column for providing ample space between the steering wheel and driver's seat to enable ready and easy entrance and exit of the driver from behind the steering wheel. It will further be apparent that a simple and durable construction has been provided wherein the normal appearance of the steering wheel is not materially altered nor any appreciable amount of added weight applied to the steering wheel.

Changes in detail may be made to the form of invention herein shown and described, without departing from the spirit of the invention or the scope of the following claims.

I claim:

1. A folding steering wheel for motor vehicles comprising a major section including a hub, a rim portion, and spokes connecting the hub and rim portion, a minor section comprising a rim portion having hinged connection at its ends with the ends of the major rim portion and an arm having hinged connection with said hub at a point in axial alignment with the hinged joint of the rim portions, a latch pin projecting upwardly from said arm, and a spring clasp pivotally connected with the hub portion and embodying yieldable plates for gripping engagement with the upper and lower sides of said arm, the upper plate of said clasp being provided with an arcuate slot opening at one side thereof for receiving said latch pin when the clasp is in operative engagement with the arm.

2. In a folding steering wheel for motor vehicles the combination with a steering column, of a major wheel section for attachment to the steering post, a minor wheel section hingedly connected with the major wheel section and embodying a rim portion, means for releasably retaining the minor wheel section in operative relation to the major wheel section, a collar carried by the steering column, a clamp loosely mounted in the collar including arcuate spring arms for receiving said rim portion, and means for locking the rim portion against withdrawal from the clamp.

ANDRÉ BOLINAS, JR.